April 13, 1954 R. J. WISE ET AL 2,675,489

FACSIMILE SIGNAL INVERTER

Filed May 7, 1951 3 Sheets-Sheet 1

INVENTORS
R. J. WISE
G. H. RIDINGS

BY A. A. Thomas

ATTORNEY

April 13, 1954 R. J. WISE ET AL 2,675,489

FACSIMILE SIGNAL INVERTER

Filed May 7, 1951 3 Sheets-Sheet 2

*INVENTORS*
R. J. WISE
G. H. RIDINGS

*BY* A. A. Thomas
ATTORNEY

INVENTORS
R. J. WISE
G. H. RIDINGS
BY
A. A. Thomas
ATTORNEY

Patented Apr. 13, 1954 2,675,489

UNITED STATES PATENT OFFICE 2,675,489

FACSIMILE SIGNAL INVERTER

Raleigh J. Wise, Arlington, and Garvice H. Ridings, Summit, N. J., assignors to The Western Union Telegraph Company, New York, N. Y., a corporation of New York Application May 7, 1951, Serial No. 224,925

10 Claims. (Cl. 250—219)

This invention relates to facsimile transmission and its purpose is to provide a simple compact signal inverter for optical scanners so that a positive facsimile copy of the scanned message will be recorded.

Briefly stated, our signal inverter utilizes two beams of light for operating a single photocell. When the white or unmarked background of a sheet is scanned, the two beams are balanced and maintain a constant illumination on the photocell. When a black mark is scanned, the beams are unbalanced and produce light impulses on the photocell to generate corresponding electric impulses which are recorded to produce a positive copy.

While signal inverters using two beams of light in connection with optical scanners are broadly old, those prior devices required two photocells and lacked adequate provisions for accurately adjusting the effect of the balancing beam on one of the photocells against the effect of the scanning beam on the other photocell.

We overcome the foregoing and other objections and disadvantages inherent in optical signal inverters of prior construction by producing a small self-contained unit easily inserted in any facsimile receiver and requiring but a single photocell. To obtain an accurate balance between the two beams we provide adjustable Polaroid means by which the strength of one beam is easily regulated with respect to the other. This Polaroid balancing means comprises a stationary element and a rotary element which can be turned to an angular position in which the two elements let the proper amount of light go through to the photocell for balancing the scanning beam that is reflected from the surface of the scanned sheet.

Our invention will be fully understood from a description of the accompanying drawings, in which.

Figures 1, 2, 3:
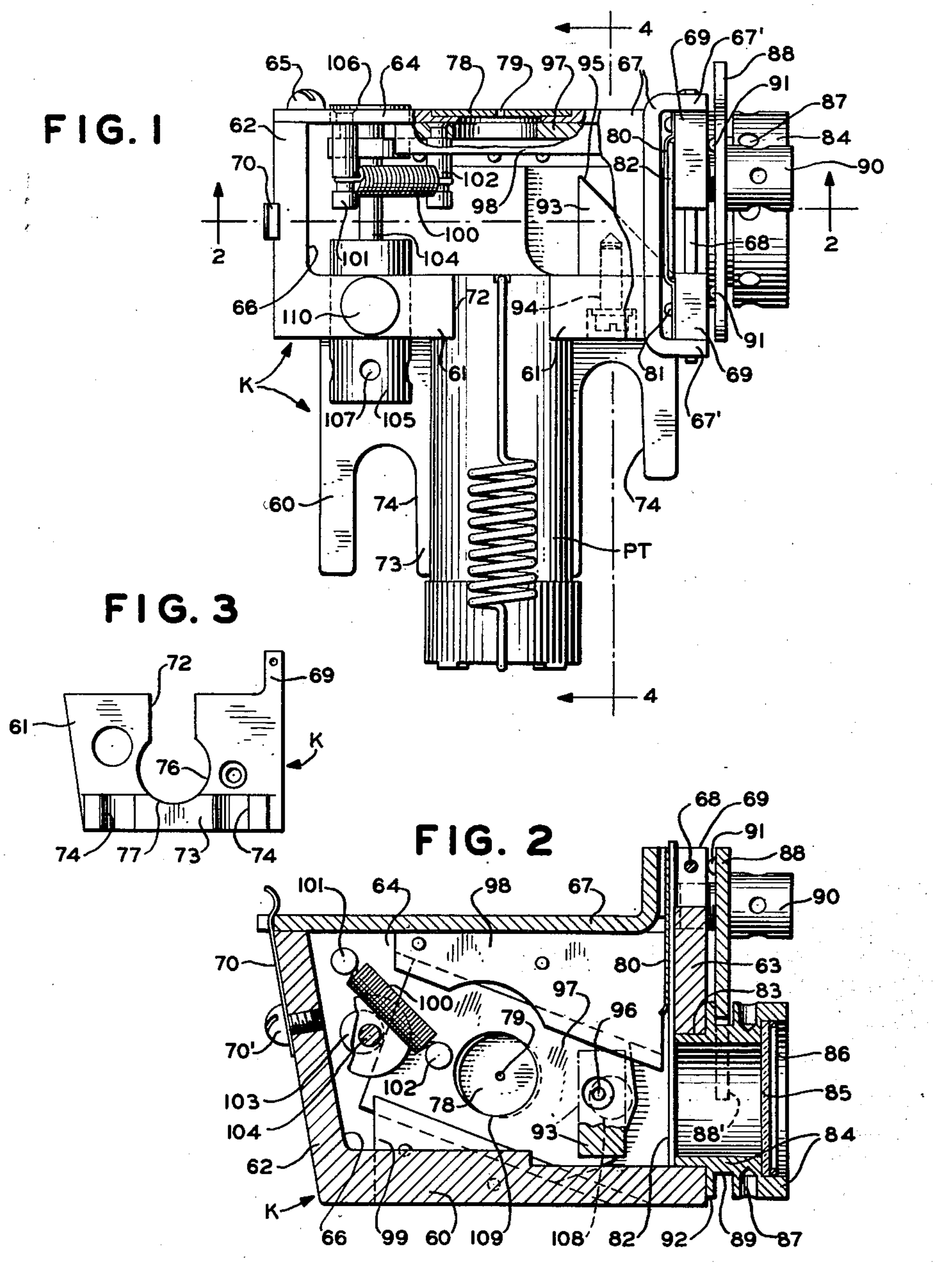
Fig. 1 is a plan view of our signal inverter greatly enlarged for clearness.
Fig. 2 is a section on line 2—2 of Fig. 1.
Fig. 3 shows a front view of the casting on which the various parts of the inverter are mounted, this view being in actual size.

The component parts of our inverter are all carried by a small casting K which comprises a base 60, a front wall 61, and two sides 62 and 63 which extend rearward. A plate 64 is secured by screws 65 to the rear edges of the side walls 62 and 63. The four walls 61 to 64 form a rectangular chamber 66 for housing certain parts, and this chamber is closed by a cover 67 hinged on a pin 68 which passes through side lugs 67′ on the cover and is supported by a pair of integral ears 69 on the side plate 63. A suitable spring latch 70 attached by a screw 70′ to the side wall 62 holds the cover closed tight, and a depending shield 71 on the cover hangs over a slot 72 in the front wall 61 to make the chamber 66 virtually lightproof.

A pickup tube PT of conventional construction is soldered or otherwise rigidly secured to the forward extension 73 of the base 60 between a pair of slots 74. These slots are adapted to receive screws or the like for adjustably attaching this optical inverter unit in a facsimile machine. As shown in Fig. 3, the slot 72 forms an extension of a circular opening 76 which merges at the bottom into a trough 77 on the base extension 73. The pickup tube PT rests in the trough 77 and its rear end fits snugly in the circular opening 76, so that the tube is rigidly held in accurate position. In other words, the pickup tube PT which focuses the scanning beam on the optical electrode of the photocell in the machine, is a permanent component part of the signal inverter unit.

The back plate 64 has a disk 78 inserted therein and a tiny aperture 79 in the center of this disk is in axial alignment with the pickup tube PT, whereby light reflected from a scanned sheet through the pickup tube passes through the aperture 79 to the photocell with which this device is associated. Those familiar with optical scanners know that between the aperture 79 and the photocell there is located a so-called light chopper disk for interrupting the beam of light issuing from the pickup aperture 79.

The right wall 63 of casting K carries on the inside a thin plate 80 secured by rivets 81 and this plate forms a narrow channel for receiving a strip of Polaroid film 82. The lower end of plate 80 acts like a spring to clamp the film 82 in position to cover a circular opening 83 in the wall 63. In the opening 83 is rotatably mounted a short tube or cylinder 84 which carries a disk 85 of Polaroid film. A circular spring wire 86 or the like holds the disk 85 in place. The cylinder 84 is provided with peripheral holes 87 for receiving a suitable tool to rotate the cylinder and the Polaroid disk 85.

A clamping plate 88 on the side wall 63 locks the cylinder 84 in adjusted position. The plate 88 has a forked end 88′ extending into a circular groove 89 in cylinder 84, and this plate is adjustable by means of a screw 90 which is mounted on the side wall 63 and passes through an opening 90′ in the plate. A pair of small knobs or buttons 91 on plate 88 act as abutments when the screw 90 is turned forward so that the forked end of the plate is forced inward, thereby holding the circular flange 92 of cylinder 84 pressed against the side wall 63 in frictional locking engagement. Conversely, to release the cylinder 84 for adjustment, the screw 90 is loosened. To remove the cylinder 84 it is only necessary to take off the plate 88 by undoing the screw 90.

The reason for adjusting the Polaroid disk 85 with respect to the fixed Polaroid strip 82 is to regulate the amount of light passing through this Polaroid assembly from an exciter lamp in the optical scanning mechanism with which this signal inverter is associated. When the optical axes of elements 82 and 85 are parallel, the light passing through is at maximum intensity, and virtually no light gets through when the axes are at right angles. Between those two extreme conditions, the angular position of the disk 85 with respect to the fixed element 82 determines the amount of light transmitted by the Polaroid assembly. This will be understood without further explanation.

To the inside face of the front wall 61 is fastened a triangular block or prism 93 by means of a screw 94. The angle surface 95 of this prism is a mirror arranged at 45° so that the light passing through the Polaroid assembly is reflected rearward at right angles through an aperture 96 in a plate 97. It will be convenient to refer to 96 as the balancing aperture to distinguish it from the pickup or scanning aperture 79. As shown in Fig. 2, the plate 97 is slidably mounted on the back plate 64 between two channeled guide blocks 98 and 99.

A contractile spring 100, attached at one end to a pin 101 on plate 64 and at the other end to a pin 102 on plate 97 constantly holds the latter against a cam or eccentric 103 fixed on a shaft 104. This shaft is mounted in the front and back plates 61 and 64 by means of journals 105 and 106. The front journal 105 is a cylindrical extension with holes 107 adapted to receive a tool for turning the cam 103 and thereby adjusting the plate 97. In this way the distance between the apertures 79 and 96 is accurately adjustable for a purpose to be presently explained.

Figure 4:
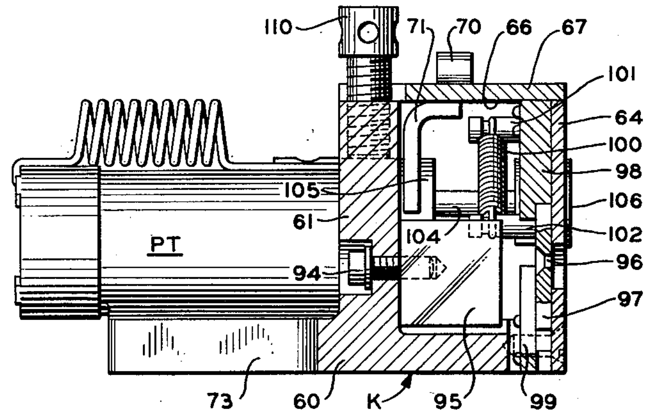
Fig. 4 is a section on line 4—4 of Fig. 1.
Figure 5:
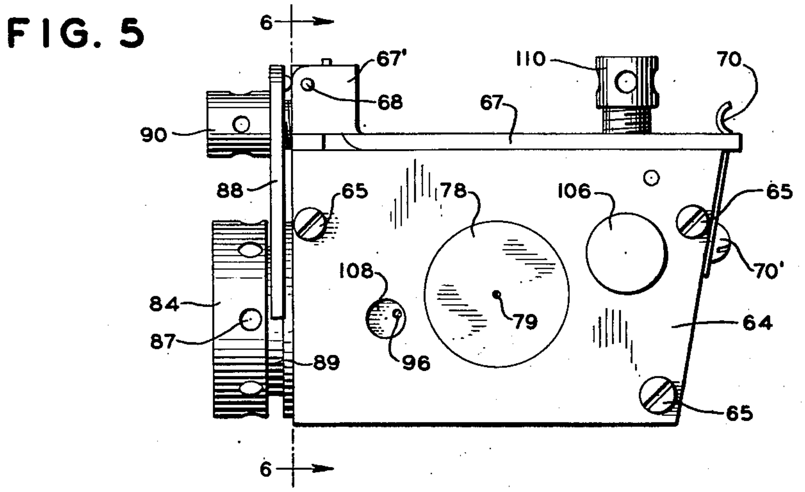
Fig. 5 shows a rear view of the inverter as it faces the photocell.
Figure 6:
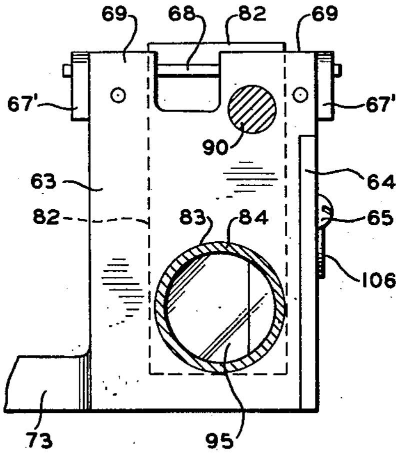
Fig. 6 is a section on line 6—6 of Fig. 5.
Figure 7:
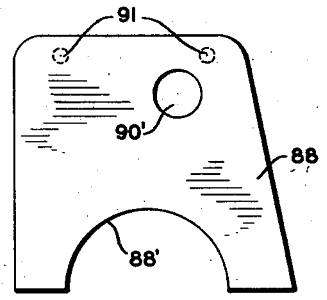
Fig. 7 shows a clamping plate associated with the adjustable Polaroid element.

The back plate 64 has an opening 108 large enough to keep the aperture 96 fully open in any position of the adjustable plate 97. A large opening 109 in plate 97 permits passage of the full scanning beam from the pickup tube PT. The cam shaft 104 is locked in adjusted position by a screw 110 which enters the front wall 61 and bears on the top of shaft journal 105 (Fig. 4). This locks the cam 103 against displacement so that it forms a rigid abutment for the plate 97 in any position under the pulling action of spring 100.

Figure 8:
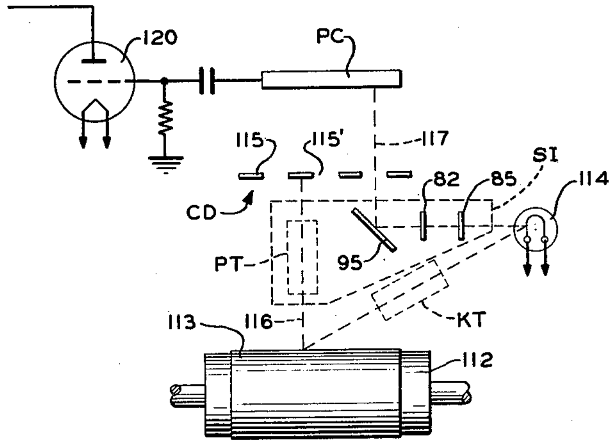
Figs. 8 and 9 are diagrams illustrating the operation of the signal inverter.
Figure 9:
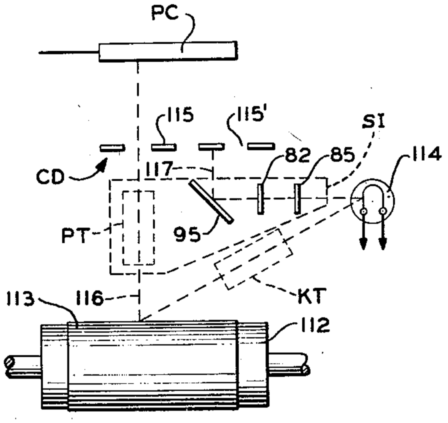

The operation of the optical assembly above described as a signal inverter will be understood from the schematic illustrations of Figs. 8 and 9, where the signal inverter of Figs. 1–7 is represented by the dotted enclosure designated S. I. the scanning mechanism is represented by a rotary drum 112 for supporting a sheet 113 in scanning position, and in which an excited lamp 114 is arranged to throw a beam of light against the sheet, and a light chopper disk CD is mounted between the pickup tube PT and the photocell PC. For simplicity we have shown only the spaced teeth 115 on the periphery of the chopper disk, it being assumed in this instance that the width of a tooth equals the width of the space 115′ between two teeth.

The beam of light reflected to the photocell PC from the surface of the scanned sheet 113 is indicated by the dotted line 116, and the dotted line 117 represents the beam passing from the exciter lamp 114 through the Polaroid elements 85 and 82 to the mirror surface 95, which reflects the light to the photocell PC. It will be convenient to call the two beams 116 and 117 the scanning beam and the balancing beam, respectively. As facsimile experts will understand, the scanning beam goes from lamp 114 through a condenser lens tube KT which focuses the light as a scanning spot on the message sheet. The condenser tube KT, unlike the pickup tube PT, is not a component part of our signal inverter unit and is indicated in Figs. 8 and 9 merely in schematic outline.

The two beams 116 and 117 are parallel and so spaced that when one beam is blocked by a tooth 115, the other beam passes through a space 115′ to the photocell. The proper distance between the beams 116 and 117 is obtained by the adjustment of plate 97, as previously explained. It is to be understood that the optical electrode of photocell PC is long enough to take in both beams 116 and 117. The photocell is connected to the grid of a tube 120 which is part of an amplifier associated with the machine where this inverter is installed.

The message sheet 113 is supposed to be an ordinary telegram blank of the familiar yellow color, but it will be convenient to refer to the unmarked background of the sheet as white to distinguish it from the black or dark characters of the message. The beam 117 is so adjusted by means of the Polaroid element 85 that when the white background of a blank is scanned, the amount of light received by the photocell PC from each beam is the same. In practice, this balancing adjustment is determined electrically by means of a decibel meter which indicates the proper balance of the two beams by the output level readings for black and white scanning. However, for the present description it is enough to say that the beams 116 and 117 are balanced when the amplifier tube 120 passes no signals during the scanning of white background.

For clearness, the beams 116 and 117 are represented in Figs. 8 and 9 as mere lines, but in actual practice they have a width equal to the width of a tooth 115 or a space 115′ in the chopper disk. Therefore, when either beam is fully blocked by a tooth, the other beam passes fully through a space. Then, as one beam is being unblocked in passing from tooth to space of the revolving disk CD, the other beam is at the same time blocked off in passing from space to tooth. As a result, the photocell PC receives a constant amount of light during the scanning of the message background, so that no signals are impressed on the grid of tube 120 and no markings are made by the recording stylus of the distant receiver.

However, when the light from lamp 114 strikes a black mark on the message sheet 113, the scanning beam 116 is virtually extinguished while the other beam 117 is unaffected and remains in its balanced condition. Therefore, the photocell PC will receive light from beam 117 only and this beam will be interrupted by the chopper disk to produce signals of the required frequency. These signals are impressed on the grid of tube 120 and passed on to the connected recorder, which will therefore make a positive copy of the transmitted message.

It will be seen from the foregoing description of a practical embodiment of our invention as actually constructed and commercially used that we have produced an optical signal inverter with all the component parts mounted on a single casting. The result is a small compact unit that is easily installed in any optical transmitter, and the adjustable Polaroid assembly provides a simple means for regulating the balancing beam to the required degree of accuracy.

In describing the location of certain parts, we have used such terms as front and back in a relative sense only upon the convenient assumption that the position of the signal inverter unit in a machine is like that shown in Fig. 1. That is, the pickup tube PT is assumed to be in front and the back plate 64 faces the photocell of the optical scanning mechanism. Various changes in details are possible within the scope of the appended claims.

We claim as our invention:

1. A signal inverter for optical facsimile transmitters comprising a box-like structure which forms a chamber, means carried by said structure for directing two parallel beams of light through said chamber to a photocell in the transmitter, said means including a lens tube in the path of the scanning beam and a Polaroid device in the path of the other beam, and rotary means for adjusting said Polaroid device to regulate the intensity of said other beam in relation to the scanning beam.

2. A signal inverter for optical facsimile transmitters comprising a casing which forms a closed chamber, said casing having two apertures spaced a certain distance apart, a lens tube for directing a scanning beam into the chamber and out through one of said apertures, means for directing a second beam into the chamber and out through the other aperture, said means including a Polaroid device carried by said casing and adjustable to regulate the intensity of the second beam in balanced relation to the scanning beam.

3. A signal inverter for optical facsimile transmitters comprising a casing formed with a base extension and with walls arranged to form a chamber back of said extension, a pickup lens tube secured to said base extension and terminating in an opening provided in the front wall of said casting, the back wall of said chamber having a fixed aperture in optical alignment with said lens tube, means providing a second aperture in the back wall adjustable in relation to the fixed aperture, a Polaroid device mounted on another wall of said casting to transmit a beam of light into said chamber, means in said chamber for directing said beam of light through the second aperture, and means for adjusting said Polaroid device to regulate the intensity of the light transmitted thereby into the chamber.

4. A signal inverter for optical facsimile transmitters comprising a casting which has a base and walls arranged to form a chamber, a lens tube fixed on said base in front of said chamber, the back wall of said chamber having a small aperture in line with the said tube and a large opening at a certain distance from said aperture, a plate adjustably mounted on said back wall and having an aperture which is always in register with said opening, means for adjusting said plate to locate its aperture at the correct distance from said fixed aperture in the back wall, a Polaroid device mounted on a side wall of the casting for transmitting light into said chamber, a mirror in said chamber for reflecting the polarized beam through the aperture in said plate, and means for adjusting said Polaroid device to regulate the intensity of the light passing therethrough.

5. A signal inverter for optical facsimile signal transmitters comprising a base and walls arranged to form a chamber, a lens tube fixed on said base, one of said walls having a small fixed aperture in line with the axis of said tube and a large opening at a certain distance from said aperture, a plate slidably mounted on said apertured wall within the chamber and having an aperture which is always in register with said opening, cam means in said chamber for adjusting said plate to locate its aperture at the correct distance from said fixed aperture, a Polaroid device mounted on another of said walls for transmitting a beam of light into said chamber, means for adjusting said device to regulate the intensity of the beam passing therethrough, and means in said chamber for reflecting the polarized beam through the aperture in said plate.

6. A signal inverter for optical facsimile transmitters comprising a unitary casting with walls which form a chamber, one of said walls having two apertures spaced a certain distance apart, a lens tube carried by said casting outside the chamber and arranged in optical alignment with one of said apertures, another wall of said casting having an opening, a cylinder rotatably mounted in said opening and carrying a Polaroid element, a second Polaroid element supported in said chamber over said opening, said cylinder being rotatable to adjust the first element relatively to the second element for regulating the intensity of the light beam transmitted through said opening into the chamber, and means in said chamber for reflecting the polarized beam through the other aperture.

7. A signal inverter for optical facsimile scanners comprising a box-like structure which forms a chamber for the passage of light to a photocell in the transmitter, a cylinder rotatably mounted in a wall of said structure, a Polaroid disk carried by said cylinder, means for releasably clamping said cylinder in adjusted position against said wall, a Polaroid strip mounted in said chamber at the inner end of said cylinder, said polarized members cooperating to transmit a beam of light with an intensity depending upon the radial position of said cylinder, and means in said chamber for directing the polarized light beam to the photocell.

8. A signal inverter for optical facsimile transmitters comprising walls arranged to form a chamber, one of said walls having a small fixed aperture and a large opening at a certain distance from said aperture, a plate adjustably mounted on said apertured wall within said chamber and having an aperture which is always in register with said opening, means for adjusting said plate to locate its aperture at the correct distance from said fixed aperture, a Polaroid device mounted on another of said walls for transmitting light into said chamber, said device comprising a fixed Polaroid element within the chamber and a second Polaroid element mounted outside the chamber for rotary adjustment to regulate the intensity of light transmitted by said elements, and means in said chamber for reflecting the polarized light through the aperture in said plate.

9. A signal inverter for optical facsimile transmitters comprising a box-like structure which forms a chamber provided with a fixed scanning aperture in one of its walls, said wall having a large opening spaced from said aperture, a plate slidably mounted on said wall and having an aperture which is always in register with said opening, a rotary shaft carried by said structure and passing through said chamber, a cam fixed on said shaft within said chamber, a spring constantly holding said plate against said cam, means outside the chamber for turning said shaft to operate said cam and thereby adjust said plate to a position where its aperture will be in correct relation to said scanning aperture, means for directing a beam of light through the aperture in said plate, and means carried by said structure having an adjustable optical transparency for regulating the intensity of the beam passing through said plate aperture.

10. A signal inverter for facsimile transmitters which are provided with optical scanning mechanism which includes a photocell and a light chopper disk, said signal inverter comprising a base and walls arranged to form a chamber, a pickup lens tube fixed on said base in front of said chamber and arranged to pass the scanning beam to the photocell of said mechanism, the back wall of said chamber having an aperture in line with the axis of said tube and a large opening at a certain distance from said aperture, a plate slidably mounted on said back wall and provided with an aperture which is always in register with said opening, means for adjusting said plate to locate its aperture at the correct distance from said fixed aperture in the back wall, a light transmitting device mounted on a side wall of said chamber, a mirror arranged in said chamber for reflecting the light beam transmitted by said device through the aperture in said plate to the photocell, the distance between said apertures being such that when one beam strikes a tooth of the chopper disk the other beam simultaneously passes through a space in the toothed disk, and means for adjusting said device to regulate the intensity of the light beam passing therethrough, whereby the effect of the last-mentioned beam on the photocell is accurately balanced against that of the scanning beam to maintain a constant illumination on the photocell when said mechanism scans an unmarked area on the message sheet.

References Cited in the file of this patent

UNITED STATES PATENTS

| Number | Name | Date |
| --- | --- | --- |
| 2,021,474 | Bartholomew | Nov. 19, 1935 |
| 2,158,391 | Wise | May 16, 1939 |
| 2,315,361 | Wise | Mar. 30, 1943 |
| 2,450,030 | Wise | Sept. 28, 1948 |
| 2,546,466 | Marzan | Mar. 27, 1951 |